United States Patent [19]

Mortenson

[11] Patent Number: 4,790,547
[45] Date of Patent: Dec. 13, 1988

[54] TWO-WHEELED HAND TRUCK CONSTRUCTION

[75] Inventor: Carl N. Mortenson, Midland, Mich.

[73] Assignee: Magline, Inc., Pinconning, Mich.

[21] Appl. No.: 77,744

[22] Filed: Jul. 27, 1987

[51] Int. Cl.$^4$ .............................................. B62B 1/04
[52] U.S. Cl. ................................................. 280/47.27
[58] Field of Search ........................... 280/42.27, 47.28

[56] References Cited

U.S. PATENT DOCUMENTS

| D. 146,419 | 2/1947 | Peterson | 280/47.27 |
|---|---|---|---|
| 2,396,953 | 3/1946 | Kirchdorfer | 280/47.27 |
| 2,980,200 | 4/1961 | Kibby | 280/47.27 |
| 3,046,035 | 7/1962 | Nichols | 280/47.27 |
| 3,104,890 | 9/1963 | Hill | 280/47.27 |
| 3,193,123 | 7/1965 | Wouden | 280/47.27 |
| 3,997,182 | 12/1976 | Mortenson | 280/47.27 |
| 4,121,855 | 10/1978 | Mortenson | 280/47.29 |
| 4,235,449 | 11/1980 | Tarran | 280/47.28 |
| 4,275,894 | 6/1981 | Mortenson | 280/47.29 |
| 4,420,166 | 12/1983 | Law et al. | 280/5.24 |
| 4,563,014 | 1/1986 | Mortenson | 280/47.27 |

FOREIGN PATENT DOCUMENTS 538817 8/1941 United Kingdom ............ 280/47.27

Primary Examiner—David M. Mitchell
Assistant Examiner—Eric D. Culbreth
Attorney, Agent, or Firm—Learman & McCulloch

[57] ABSTRACT

An improved two-wheeled hand truck, with a pair of horizontally spaced, vertically extending side rails, connected to form a primary frame, has axle-supporting brackets fixed to the lower end of each side rail and extending rearwardly therefrom to support an axle and a pair of wheels. An angle-shaped nose plate, having a forwardly extending load support platform, and an upturned rear wall, releasably mounts a generally T-shaped pedestal part with a post which is receivable within the side rail for releasably securing each of the side rails to the forwardly extending portion of the nose plate. A second rigid connection to resist pivoting of the nose plate is provided on each wheel supporting bracket, at a spaced distance rearwardly from each side rail for fixing the upturned portion of the nose plate to each bracket.

5 Claims, 2 Drawing Sheets

TWO-WHEELED HAND TRUCK CONSTRUCTION

BACKGROUND OF THE INVENTION

This invention relates to two-wheeled hand trucks or dollies of the type wherein a load-supporting nose plate mounts to a primary frame which supports a pair of wheels in a manner so that the load can be received on the nose plate and transported, with the frame in a vertically inclined position.

Hand trucks of varying design have been patented by the assignee of the present invention and among them are U.S. Pat. Nos. 3,997,182; 4,121,855; 4,275,894; 4,420,166; and 4,563,014. These hand trucks, which have been constructed with a considerable number of die cast component parts for purposes of strength, have been sold widely.

Another prior hand truck of which applicant is aware uses a die-cast component consisting of wheel-supporting brackets integrated by a spanning front wall which serves as a load rest for a separate horizontal nose plate. In this latter construction, the front wall has raised bosses on which the side rails of a primary frame are secured by means of screws extending up from the bottom of the nose plate and through the bosses into blind bores provided in the side rails. The front wall further has rail engaging walls at its sides which are bolted to the side rails.

SUMMARY OF THE INVENTION

The hand truck of the present invention includes a primary frame, mounted on a pair of wheels supported by a pair of discrete wheel-supporting brackets which project rearwardly from the side rails of the primary frame. An angular nose plate has a forwardly projecting, load-supporting platform and a rear wall disposed rearwardly of the side rails of the primary frame. Generally T-shaped pedestal parts, having bases and reduced size, upstanding posts are removably mounted on the upper surface of the load-support platform, the posts being of complementary shape to, and received in, the hollow side rails. The pedestal posts secure to the side rails by means of laterally extending securing members which extend through laterally aligned openings provided in the side rails and the pedestal posts.

Clips or clamps removably mounted on the upturned rear portion of the nose plate fix the upturned portion of the nose plate to the axle-supporting brackets at spaced distances rearwardly of the side rails.

One of the primary objects of the present invention is to provide a hand truck which is so conceived as to use a fewer number of expensive die cast parts, and a greater number of aluminum parts, without in any way sacrificing the strength of the hand truck and reducing its load-bearing capability. In this respect, it should be noted that applicant, with the present construction, finds it possible to utilize nose plates formed of aluminum plate stock or extruded aluminum members, and contemplates the use of molded plastic nose plates.

Another prime object of the invention is to provide a method of securing a load-bearing, angle-shaped nose plate to a hand truck in a manner such that maximum flexibility in the selection of the length of the nose plate and the material from which it is constructed is achieved, the multiple securement system resisting any tendency of the nose plate to pivot and be damaged in a situation in which it is inadvertently dropped on its nose plate.

A further object of the invention is to provide cast aluminum pedestal parts, including bases on which the side rails of the primary frame are received, and posts which are shaped to be received with only sliding clearance within the lower ends of the side rails.

Another object of the invention is to provide a hand truck in which virtually all components thereof save the two axle supporting axle brackets can be formed of lightweight aluminum metal, rather than die cast material, with the consequent saving in manufacturing costs, and with the added attribute of providing a hand truck of lighter weight.

Still another object of the invention is to provide a hand truck utilizing an angle-shaped nose plate wherein a multiple nose plate securing structure includes pedestals for receiving and fixing the lower ends of the side rails, and rigid clips mounted on the upturned rear wall of the nose plate which removably fix the rear wall of the nose plate to the individual axle-supporting brackets at spaced distances rearward of the side rails to resist any tendency of the nose plate to pivot about said side rails.

A further object of the invention is to provide a very simple and practical hand truck of improved character which can be economically marketed, and effectively utilized to manually transport a wide variety of products.

Other objects and advantages of the invention will be pointed out specifically, or will become apparent from the following description when it is considered in conjunction with the appended claims and the accompanying drawings.

IN THE DRAWINGS

Figure 2:
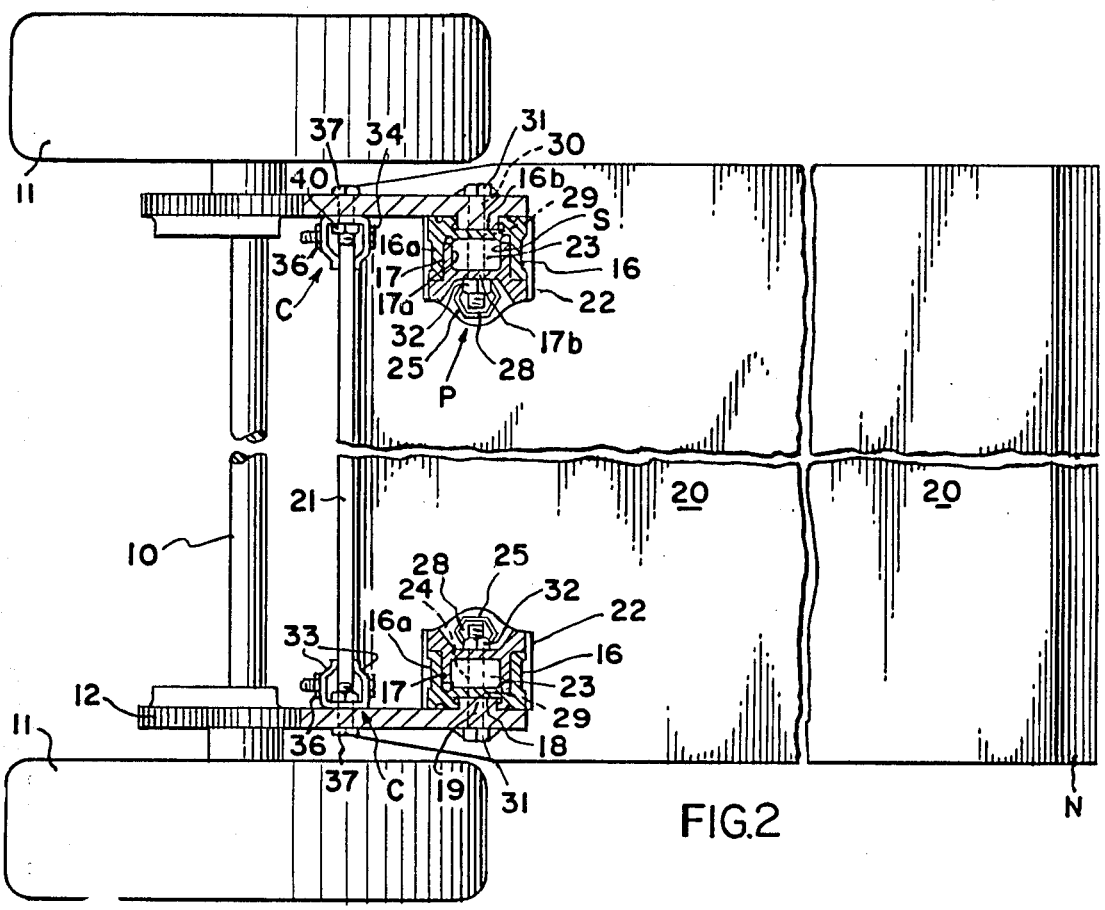
FIG. 2 is a sectional plan view, taken on the line 2—2 of FIG. 1.

Referring now more particularly to the accompanying drawings, and in the first instance to FIGS. 1-5 thereof, the hand truck of the present invention comprises an axle 10, supporting ground-engaging rubber-tired wheels 11 in the usual manner Die cast axle and wheel-supporting bracket plates 12, have openings 13 in aligned pairs, and it will be noted that the axle 10 passes through the selected aligned pairs of the openings 13 in the usual manner, to support the wheels 11.

Each axle-supporting bracket 12 extends forwardly to mount to the lower end of a primary frame, generally designated F, which may be of the type disclosed, for example, in U.S. Pat. No. 3,997,182. The frame F comprises an open framework made up of generally vertical hollow side rail members 14, connected by horizontal brace rails 15 at vertically spaced intervals. As in the patent mentioned, the upper rail may comprise a handle for propelling the hand truck manually.

The side rails 14 are formed of extruded, generally U-shaped interfitting outer and inner members 16 and 17, in the usual manner. It will be noted that the elongate outer member 16 includes a pair of side legs 16a, connected by a web portion 16b, and the members 17 include a pair of side legs 17a, received within the legs 16a, and a connecting web portion 17b. As in previous constructions, such as the hand truck disclosed in the present assignees U.S. Pat. No. 3,997,182, the web portion 16b of each rail 14 is formed with a vertically extending groove, the lower portion of which functions as a keyway 18 for receiving a vertically extending laterally projecting key member 19, provided integrally at the front end of each brackets 12.

The hand truck is provided with an angle-shaped nose plate, generally designated N, having a load-support platform 20 which can be longer in length than previously, and an upturned rear wall 21 which is situated at a spaced distance rearwardly of rails 14. To removably connect the nose plate N in position, I have fabricated a pair of separate pedestal members, generally designated P, which are more particularly illustrated in FIGS. 3 and 4.

Each of these comprises a base portion 22, cast with an upstanding post 23 having an opening 24 in its upper end.

The base portion 22 is provided with hexagonal sockets 25, and openings 26 which enable bolts 27 and nuts 28 to secure the pedestals P securely in position. The load-supporting platform 20 is provided with the countersunk openings 20a, which each receive the head of a bolt 27, which has an Allen socket 27a and seats flush with the bottom of the load-supporting portion 20 of the nose plate N.

As FIG. 2 particularly illustrates, post 23 is of rectangular cross-section, and snugly fits the sockets S extending upwardly from the lower end of rails 14, which are formed by the surfaces of legs 17a and webs 17b and 16b.

Figure 1:
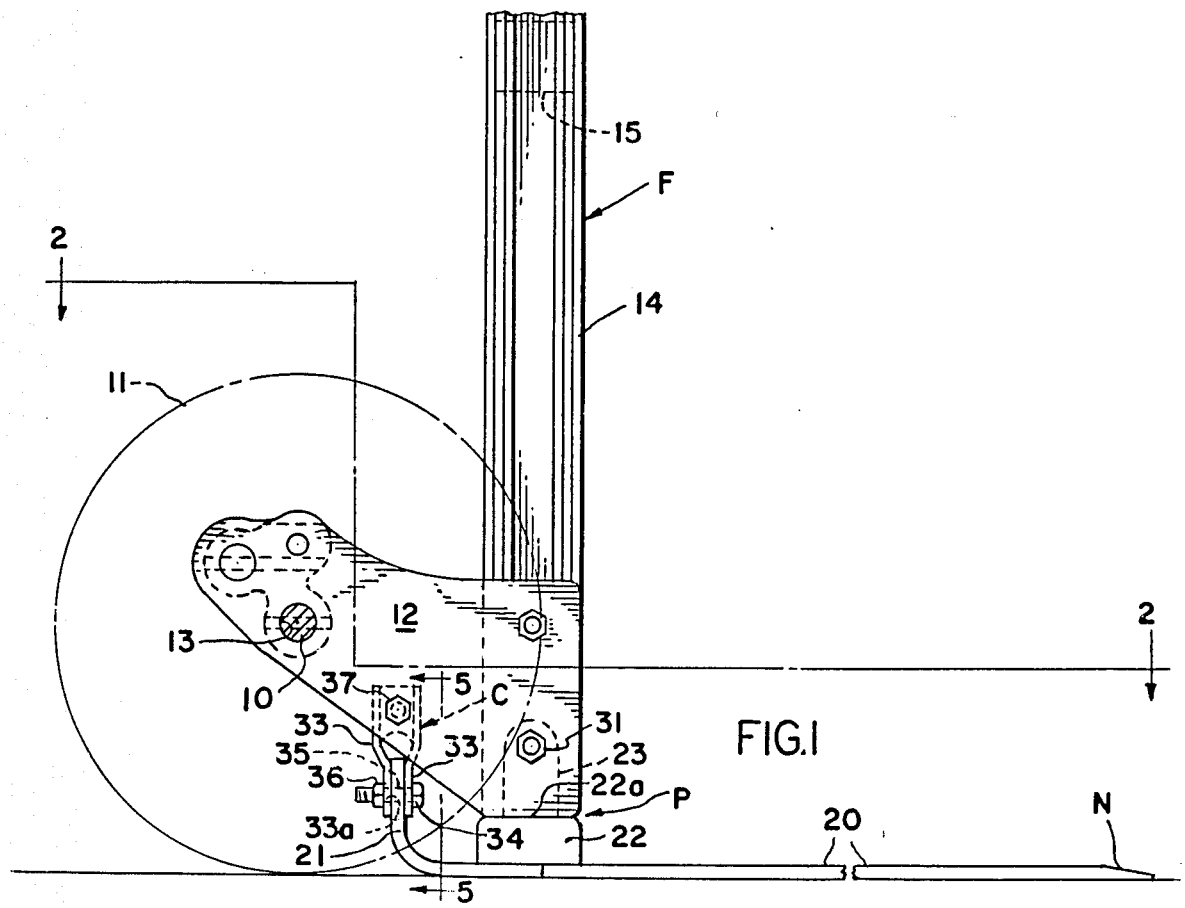
FIG. 1 is a fragmentary, side elevational view of the improved hand truck.
Figure 3:
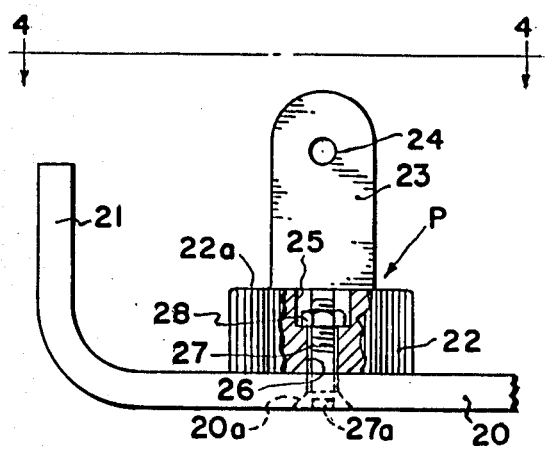
FIG. 3 is an enlarged, fragmentary, side elevational view of the nose plate and a pedestal part only, illustrating the manner in which the pedestal parts are releasably secured to the load-support platform.
Figure 4:
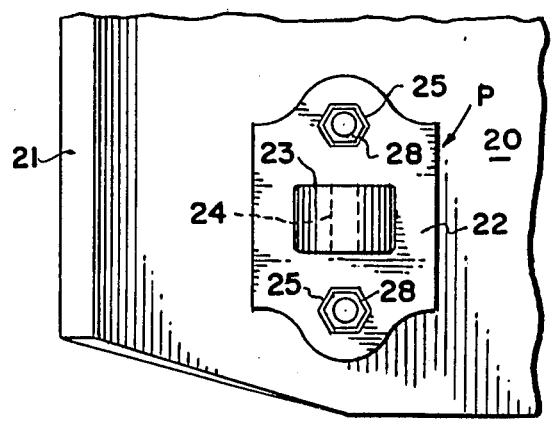
FIG. 4 is a fragmentary, top plan view thereof.
Figure 5:
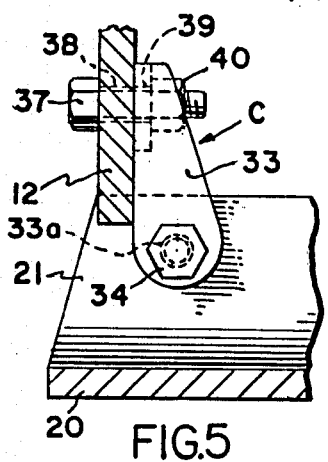
FIG. 5 is an enlarged, fragmentary, front elevational view, taken on the line 5—5 of FIG. 1, illustrating one form of clip for securing each axle supporting bracket to the upstanding rear wall of the load-supporting nose plate.

Laterally aligned openings 29, provided in the webs 16b and 17b are in alignment with the pedestal post openings 24, and with an opening 30 provided in each bracket 12, so that bolts 31, extending through the openings 24, 29 and 30, and nuts 32 can be used to secure the interfitting pedestal posts 23 in position. FIG. 1 shows the side rails 14 and brackets 12, as received by the flat upper surface 22a of the base portions 22 of pedestals P, which forms a bearing surface therefor.

Finally, to further the immobile anchorage which has been achieved with the construction described, the up-turned integral rear portions 21 of nose plate N are fixed to the brackets 12 rearwardly of the rails 14. This is accomplished by rigid clip members, generally designated C (FIGS. 1, 2 and 5), which in plan are U-shaped, as shown in FIG. 2, and have inturned parallel lower legs 33, with openings 33a, for receiving bolts 34 extending through openings 35 provided in the upturned wall 21, the bolts 34 being secured by nuts 36. The upper ends of clips C are secured to the brackets 12 by bolts 37, extending through openings 38 provided in the brackets 12, and openings 39 provided in the clips C, bolts 37 being retained by nuts 40.

Figure 6:
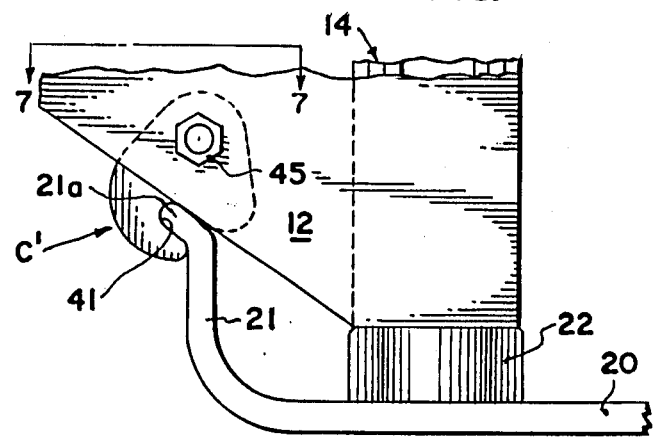
FIG. 6 is an enlarged, fragmentary, side elevational view, showing an alternate form of rigid clip.
Figure 7:
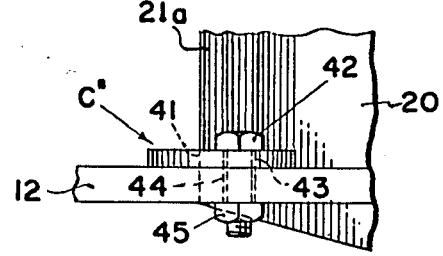
FIG. 7 is a fragmentary, top plan view taken on the line 7—7 of FIG. 6.

An alternative clip construction is shown in FIG. 6 which makes it unnecessary to drill the nose plate wall 21. Here the clip, generally designated C', is hook-shaped and is provided with a downwardly and forwardly inclined slot 41 for receiving the rearwardly and upwardly turned upper edge 21a of the wall 21. As FIG. 7 indicates, each clip C' is removably fixed in position by a bolt 42, extending through an opening 43, provided in the clip C', and an opening 44 provided in the bracket 12, and extending to be retained by a nut 45.

THE OPERATION

The operation of hand trucks of this character is well-known, and need not be particularly described.

Plainly, when changing or replacement of the nose piece N is contemplated, it is simply necessary to disengage clips C or C' and reengage clips C or C' when a new nose piece N has been substituted for the nose piece being replaced. The pedestal mountings P in combination with the securement of the upturned walls 21, to the brackets 12 at a location spaced rearwardly from rails 14, provides a fixed, stable structure which permits the use of nose pieces N of differing character without the sacrifice of hand truck capability.

While one embodiment of the invention has been described in detail, it will be apparent to those skilled in the art that the disclosed embodiment may be modified.

Therefore, the foregoing description in all aspects is to be considered exemplary, rather than limiting in any way, and the true scope of the invention is that defined in the following claims.

What is claimed is:

1. A method of securing an angle-shaped nose plate, having a forwardly extending load support platform, and an upturned rear portion, to the lower end of a two-wheeled hand truck construction comprising a pair of horizontally spaced, vertically extending side rails connected laterally to form a hand truck frame; a discrete axle supporting bracket fixed to the lower end of each or the side rails and extending rearwardly therefrom; axle means supported by said brackets, and a pair of wheels on said axle means, the steps including:
   a. releasably fixing spaced apart, upstanding pedestal parts having vertical axes to the upper surface of the said platform;
   b. relatively telescoping the side rails and pedestal parts along said axes to a rail received position and releasably fixing the side rails in received telescoped position;
   c. further releasably fixing the upturned portion of the nose plate to each axle-supporting bracket at a spaced distance rearwardly from each side rail to resist pivoting of the nose plate.

2. The method defined in claim 1 wherein the side rails have polygonal recesses in their lower ends open to said lower ends and the pedestal parts are T-shaped pedestal parts having bases and reduced sized posts of reduced cross-section relative to the bases; and telescoping is effected by snugly receiving the posts within the recesses in the lower ends of the side rails.

3. The method defined in claim 2 wherein a manipulatable laterally extending clamp fastener is inserted through each side rail, the pedestal received therein, and each bracket, and manipulated to clamp the side rail, pedestal part, and bracket together rigidly.

4. The method of securing an angle shaped nose plate, having a forward extending load supporting platform, and a rear generally vertical rest portion to the lower end of a two-wheeled hand truck construction comprising a pair of horizontally spaced vertically extending side rails connected laterally to form a hand truck frame, an axle-supported bracket fixed to the lower end of each of the side rails and projecting rearwardly therefrom, axle means supported by the brackets, and a pair of wheels on the axle means, the steps including:
- a. releasably fixing laterally spaced apart, upstanding pedestal parts having vertical axes to the upper surface of the said platform;
- b. relatively telescoping the side rails and pedestal parts along said axes to a rail received position and releasably fixing the side rails in received telescoped position; and
- c. inserting a clamp fastener through each side rail, the pedestal and each bracket, and manipulating the fastener to releasably fix the side rail, pedestal, and bracket together rigidly.

5. The method defined in claim 4 wherein the side rails have tubular lower ends and the pedestal parts are T-shaped pedestal parts having bases and reduced size upstanding posts or reduced cross-section relative to the bases; and telescoping is effected by snugly receiving the posts within the open lower ends of the side rails in bearing engagement with the bases.

* * * * *